Patented May 20, 1947

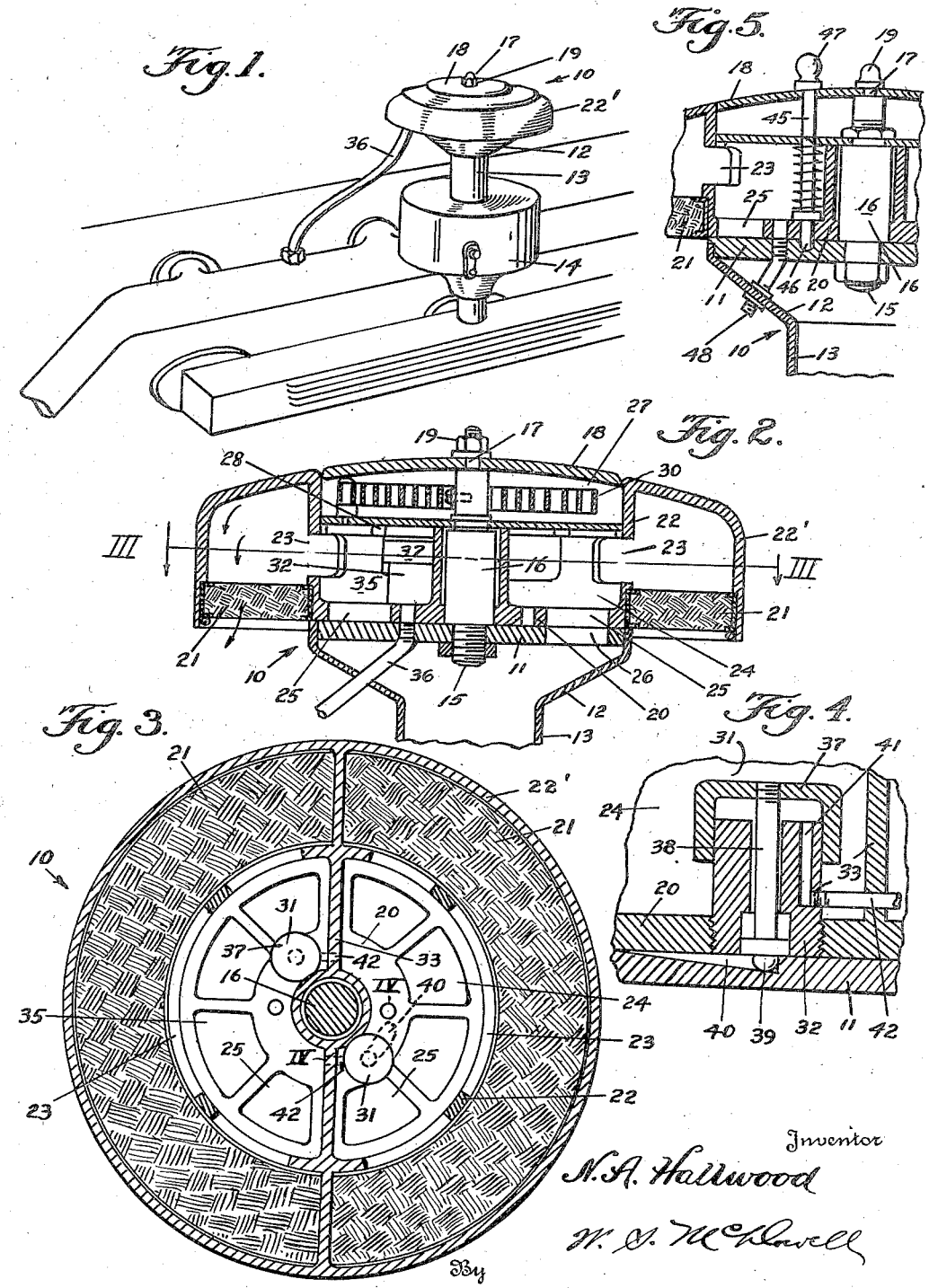

2,420,822

UNITED STATES PATENT OFFICE 2,420,822

AIR FILTER FOR CARBURETORS

Nathan A. Hallwood, Columbus, Ohio; Harold S. Hallwood administrator of said Nathan A. Hallwood, deceased Application April 19, 1944, Serial No. 531,713

8 Claims. (Cl. 183—52)

This invention relates to filters, and has particular reference to filters of the type adapted to remove fine solids suspended or entrained in gaseous fluids. In a more specific aspect, my invention is concerned with an improved filter for removing dirt and other fine solids from air supplied to the carburetor of an internal combustion engine.

Filters, as ordinarily constructed, and adapted for use on the air intakes of engine carburetors, provide stationary filtering elements which, if initially efficient, become readily clogged with foreign matter and require frequent replacement in order to provide for the desired flow of strained or dust-free air into the carburetors.

It is, therefore, an object of the present invention to provide an improved filter for use in the capacity set forth which, when the active filtering surfaces thereof become clogged or obstructed with solids to an extent sufficient to interfere with engine operation, provides means for presenting, manually or automatically, a fresh or renewed filtering surface to the path of air flowing toward the associated carburetor, so that the filtering medium may be maintained, over prolonged periods of engine operation, in a condition of peak or high efficiency.

It is another object of the invention to provide an air filter for carburetors comprising a casing having an air inlet passage in which is arranged for rotatable movement one or more filter elements, the latter being carried by a supporting frame with means provided tending to rotate said frame, such rotation, in automatic operation, being controlled by a pneumatically actuated release member, said member being responsive to unbalanced fluid pressures created within the casing of the filter to provide for the movement of said frame when the active filter element or surface becomes clogged with obstructing matter, whereby to present a clean filter element or surface to the air-admitting passages of the casing.

It is another object of the invention to provide an air filter for engine carburetors in which exhaust gases, obtained from the exhaust manifold or conduits of the associated engine, are employed to revivify and restore for active operation filter elements or regions thereof clogged with flow-obstructing solids.

Other objects and advantages of the invention will be apparent by reference to the following description and the accompanying drawings, wherein is set forth one of the preferred structural embodiments of my improved air filter.

In said drawings:

Fig. 1 is a perspective view of my improved filter disclosing the same on an engine carburetor;

Fig. 2 is a vertical sectional view taken through the filter;

Fig. 3 is a horizontal sectional view taken through the filter on the line III—III of Fig. 2;

Fig. 4 is a detail vertical sectional view taken through the pneumatic release for the filter disk or frame on the line IV—IV of Fig. 3;

Fig. 5 is a detail vertical sectional view disclosing my filter apparatus when constructed for manual adjustment.

Referring more particularly to the drawings, my improved filter embodies a casing 10, which is formed to comprise a horizontally disposed stationary base plate 11 carrying a depending conduit 12 which terminates in a restricted throat portion 13 adapted to enter the air inlet of a carburetor 14, on which the casing is stationarily supported. The plate 11 is formed axially with an opening for the reception of the reduced threaded extension 15 of a vertically disposed stud 16, the lower end of the extension 15 receiving a clamping nut by which the stud is stationarily retained in an upright position in connection with the plate 11. The extreme upper end of the stud 16 is shouldered and formed with a reduced threaded extension 17, the latter being received in an opening provided axially in a cover member 18, forming a part of the filter casing. The extension 17 may be provided with removable binding nuts 19 to hold the cover member in its fixed position of operation.

Mounted for rotation on the upper surface of the plate 11 about the axis provided by the stud 16, is a filter frame 20 of disk-like construction. Adjacent to its outer periphery, the frame 20 carries a pair of segmental filter elements 21. These elements are formed from materials normally pervious to the transmission of air therethrough but capable of obstructing and collecting on the surfaces thereof fine or coarse solids, such as the dirt or dust contained in atmospheric air used for fuel-carburetting purposes. In this connection, the filter elements may be of the so-called depth type in which closely matted strands or fibers of organic or inorganic materials are present, or of the so-called surface type of filter in which air pervious materials, such as paper or paperboard, are impregnated with resins or thermo-setting plastics such as Bakelite.

By being carried by the outer portion of the frame 20 in a normally horizontal plane, the elements 21 are disposed between an intermediate wall 22 of the frame 20 and an outer peripheral wall 22' thereof. When so positioned, air is drawn from the atmosphere through one of the elements 21, as disclosed at the right of Fig. 2, extracting solids from the air during its passage through the actively positioned filter element. The filtered air then passes through an opening 23 provided in the annular wall 22 and enters a semicircular chamber 24 formed in the frame 20. The disk-like body of the frame 20, which is rotatably supported on the upper surface of the base plate 11, is formed with a plurality of openings 25, the latter registering with corresponding openings 26 provided in the base plate 11. The filtered air then passes through the conduit 12 and its throat 13 into the air inlet of the carburetor 14.

When the actively positioned filter element, i. e., the one shown at the right of Fig. 2, becomes clogged with solids to an extent that air flow therethrough is obstructed, the operation of the engine associated with the carburetor 14, creates a partial vacuum or sub-atmospheric pressures within the chamber 24, and these pressures are used to release automatically the filter frame 20 so that the same may be revolved through an arc of substantially 180°, whereby to cause a fresh or revivified filter element or filter area to be presented to the path of air flow through the filter from the atmosphere to the carburetor.

To provide for this automatic turning of the frame 20, there is provided in the top of the casing 10 a spring chamber 27, the bottom of this chamber being closed by a plate 28 which, axially, rests on an annular shoulder provided intermediately of the height of the stud 16, and at its outer edge on a shoulder formed by the annular upstanding wall 22 of the frame 20, so that the plate rotates in unison with the filter frame. Within the chamber 27, there is disposed a spiral clock-type spring 30, one end of which is fastened to the stationary stud 16 and its other end is connected to the plate 28, so that as the spring unwinds, it will impart rotation to the filter frame.

Normally, such rotation of the filter frame is prevented by pneumatically controlled stop or release mechanism indicated generally at 31. This mechanism consists of a pair of barrel elements 32 arranged on opposite sides of the vertical divisional wall 33 of the frame 20, said latter wall separating the chamber 24 from a complemental chamber 35 on the opposite side of the filter frame. The chamber 35 communicates with one end of a conduit 36, the other end of this conduit being extended to the exhaust manifold, or conduits leading from it, of the associated engine, whereby a portion of the moisture-containing exhaust gases of the engine will be delivered under positive flow to the chamber 35.

Each of the barrel elements 32 carries a reciprocating open-bottomed cap 37, each cap being provided with a depending plunger 38, the lower end of each plunger being provided with a semi-spherical extension 39, the latter being receivable within an arcuate sloping-bottomed slot or recess 40 provided in the upper surface of the plate 11 in registration with the chamber 24. The barrels 32 are formed with passages 41 which terminate immediately beneath the caps 37, and these passages at their lower ends are provided with short pipe sections 42 which pass through the wall 33 so that the barrel positioned in the chamber 24 will communicate with the complemental chamber 35 and vice versa.

Thus, in operation, when the actively positioned filter element, or area of a single element, becomes clogged with foreign matter to a degree where a partial vacuum is created in the chamber 24 or 35 in registration with the active filter element or surface, the unbalanced pressures prevailing against the opposed sides of the active cap 37, effects the elevation of the latter, lifting the plunger extension 39 from engagement with an end wall of the recess 40 and thereby providing for the bodily turning movement of the filter assembly under the action of the clock spring 30 and about the axis of the stud 16. This turning movement continues through an arc of approximately 180°, or until the extension 39 of the formerly inactive plunger 38 registers with the recess 40. By bringing the fresh filter element or surface thereof into active position, balanced pressures are reestablished on the opposite sides of the actively positioned cap 37 so that gravity operation of its plunger 38 is at once obtainable.

The principal advantage obtained from using the engine exhaust gases is the fact that the same are most efficient in removing obstructing solids from the surfaces of the inactively positioned filter element. These engine exhaust gases flow through the inactive filter element in the direction indicated by the arrows in Fig. 2, and since such exhaust gases contain appreciable quantities of moisture, the same readily free adhering or accumulating solids from the surfaces of the filter elements and revivify the latter for subsequent efficient operation when actively positioned in the air stream entering the filter.

It will thus be seen that the present invention provides a filter particularly useful in the filtration of solids from air to be supplied to the carburetors of internal combustion engines. By virtue of its construction, clean filter elements or surfaces are presented to the path of air flow into a carburetor at all times. When the actively positioned element becomes obstructed or partially obstructed to a predetermined degree with accumulated solids, it is removed automatically from its active position and a fresh or clean filter element presented to the inflowing air stream for sustained and efficient operation. The construction of the filter which provides for the automatic shifting of the filter elements between active filtering and revivifying positions, eliminates the necessity for manual attention.

It is within the scope of the invention, however, to employ manual adjustment of the filter carrier rather than automatic adjustment. For instance, as shown in Fig. 5, the rotatable filter carrier 20 carries a spring pressed plunger 45, the lower end of which is adapted to be seated in sockets 46 provided in the base plate 11. The upper end of the plunger is equipped with a manipulating knob 47 which may be manually elevated to remove the lower end of the plunger from the socket 46 in order to allow for manual rotation of the housing or filter carrier. Such rotation should be performed at periodic intervals so that fresh filter media may be presented to the path of air flow to the carburetor. Instead of using the exhaust gases of the associated internal combustion engine to remove clogging solids from obstructed filter media, I may employ a short pipe section 48 by means of which compressed air may be applied to the clogged filter media to remove solids or foreign matter therefrom. The principal advantage of this form of construction is its inherent mechanical simplicity.

While I have described my improved filter as being particularly useful in removing solids from gaseous fluids, as in the case of an air filter for carburetors, nevertheless, it will be understood that such use is merely exemplary of one of several uses to which the filter may be adapted and I contemplate the employment of my filter in all capacities in which it may be found useful.

I claim:

1. An air filter for engine carburetors comprising a casing having an air passageway therethrough, an intermittently rotatable filter carrier forming a part of said casing, filter media supported by said carrier and adapted to have localized regions thereof disposed in registration with said passageway, motor means applying rotative forces to said carrier, and a fluid pressure actuated escapement mechanism normally restraining said carrier against rotation and operative automatically when the region of the filter media in operation becomes relatively obstructed by solids accumulating thereon for successively presenting localized areas of said filter media to said passageways.

2. A self-cleaning air filter for engine carburetors comprising a casing having an air passageway therethrough, a rotatable filter carrier forming a part of said casing, filter media supported by said carrier and operable upon rotation of the latter to present successive regions thereof to said passageway, motor means for applying rotative forces to said carrier, escapement mechanism normally restraining said carrier against rotation and operable upon the presence of reduced pressures in said passageway to release and effect step by step rotation of said carrier to present air pervious regions of said filter media to said passageway, and means for passing the exhaust gases of an associated internal combustion engine through clogged regions of said filter media when such regions are disposed out of registration with said passageway.

3. A self-cleaning air filter for engine carburetors comprising a casing having an air passageway therethrough, a rotatable carrier forming a part of said casing and containing filter media having localized regions disposed in registration with said passageway, spring means for applying rotative forces to said carrier, a stop supported by said carrier cooperative with a stationary stop shoulder on said casing, said stop devices being responsive to abnormally reduced pressures in said passageway to release said carrier for limited rotation, whereby to bring other localized regions of said filter media into registration with said passageway.

4. A self-cleaning air filter for engine carburetors comprising a casing having an air passageway therethrough, a rotatable carrier forming a part of said casing and containing filter media having localized regions disposed in registration with said passageway, spring means for applying rotative forces to said carrier, a stop supported by said carrier cooperative with a stationary stop shoulder on said casing, said stop devices being responsive to abnormally reduced pressures in said passageway to release said carrier for limited rotation, whereby to bring other localized regions of said filter media into registration with said passageway, and means for passing the exhaust gases of an associated internal combustion engine through clogged regions of said filter media occupying positions removed from registration with said passageway.

5. An air filter comprising a conduit, a filter carrier rotatably supported on said conduit, said carrier being formed internally with relatively spaced chambers having open sides, filter media supported by said carrier in the open sides of said chambers and through which air is adapted to be passed prior to entering the chambers, said conduit having a restricted air passageway in one end thereof with which complemental passageways in said carrier chambers are adapted for successive registration through rotation of the carrier, spring means for applying rotative forces to said carrier, pressure responsive stop devices supported by said carrier in each of said chambers, each of said devices including a movable element normally coacting with a conduit carried shoulder to restrain said carrier against rotation, and pressure-transmitting connections uniting the stop device in one of said chambers with the interior of the other of said chambers, whereby when the fluid pressures within said chambers become substantially unbalanced, the stop device in engagement with said shoulder is actuated to release said carrier for limited rotation, such rotation being checked by the engagement of the other stop device with said shoulder.

6. An air filter for carburetors comprising a conduit, a base plate at one end of said conduit provided with an air-admitting opening, a stud arising from said base plate, a filter carrying housing mounted on said base plate for rotation about said stud, a divisional wall disposed internally of said housing providing a plurality of separate compartments, the bottom walls of said compartments being provided with openings adapted for registration with the opening in said base plate, stop means carried by said housing in each of said compartments and cooperative with said base plate to effect registration of said openings, filter media carried by said housing and through which air is drawn prior to entering the compartment in air flow communication with said conduit, spring means for rotating said housing when the latter is released by said stop means, and fluid-transmitting connections uniting the stop means in one of said compartments with the interior of the other compartment, whereby when the fluid pressure in one of said compartments is substantially less than that in the other, the stop means in the compartment of lowered pressure will be actuated to release said housing for limited rotation.

7. A filter as specified in claim 6, in combination with means for passing the exhaust gases of an associated internal combustion engine through portions of said filter media out of air-flow communication with said conduit to remove air-flow obstructing solids from the filter media.

8. An air filter for carburetors comprising a conduit, a base plate at one end of said conduit provided with an air-admitting opening, a stud arising from said base plate, a filter-carrying housing mounted on said base plate for rotation about said stud, a divisional wall disposed internally of said housing providing a plurality of separate compartments, the bottom walls of said compartments being provided with openings adapted for registration with the opening in said plate, filter media carried by said housing and through which air is drawn prior to entering the compartment in airflow communication with said conduit, and a releasable stop device normally holding said housing against rotation about said stud.

NATHAN A. HALLWOOD.

REFERENCES CITED

The following references are of record in the file of this patent:

UNITED STATES PATENTS

| Number | Name | Date |
|---|---|---|
| 1,493,789 | Mullen | May 13, 1924 |
| 1,153,751 | Beth | Sept. 14, 1915 |
| 1,947,447 | Brassert et al. | Feb. 20, 1934 |

FOREIGN PATENTS

| Number | Country | Date |
|---|---|---|
| 175,851 | Germany | Nov. 7, 1906 |
| 4,729 | Great Britain | Apr. 5, 1886 |